E. G. BAHL.
AEROPLANE FITTING.
APPLICATION FILED AUG. 4, 1920.
1,369,374.
Patented Feb. 22, 1921.
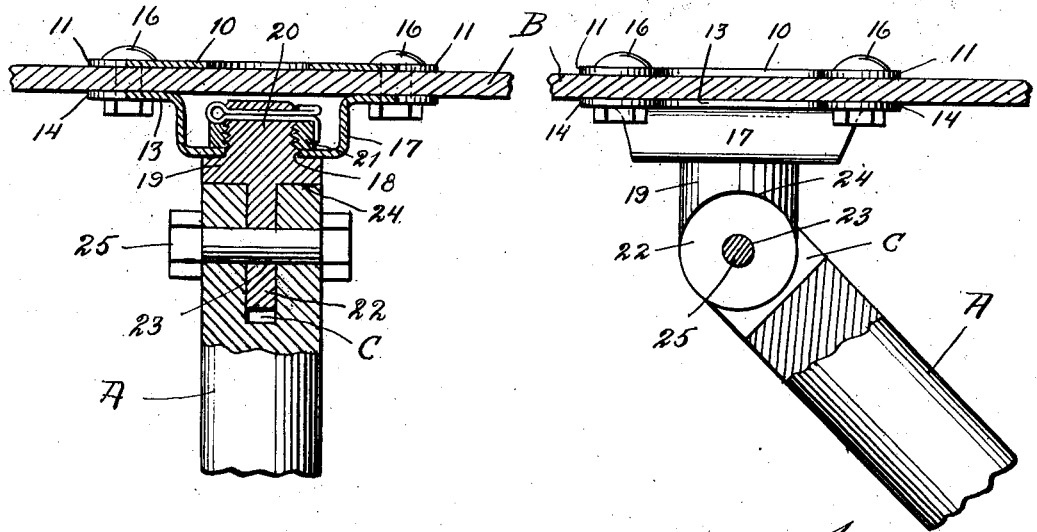
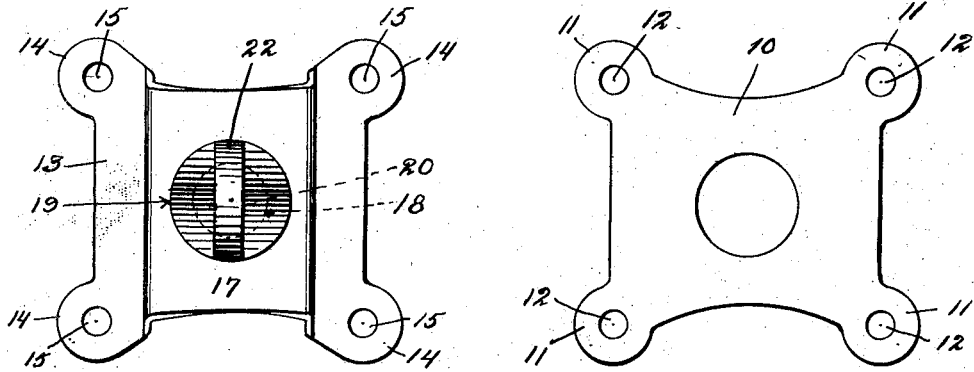
Witness:
J. Milton Jester
Inventor
Errold G. Bahl
by J. A. Gowrick
Attorney ary flexibility while at the same time main-
UNITED STATES PATENT OFFICE.

ERROLD G. BAHL, OF LINCOLN, NEBRASKA.

AEROPLANE-FITTING.

1,369,374.  Specification of Letters Patent.  Patented Feb. 22, 1921.

Application filed August 4, 1920. Serial No. 401,118.

*To all whom it may concern:*

Be it known that I, ERROLD G. BAHL, a citizen of the United States, residing at Lincoln, in the county of Lancaster and State of Nebraska, have invented new and useful Improvements in Aeroplane-Fittings, of which the following is a specification.

This invention relates to fittings for aeroplanes and has for its object the provision of a novel fitting whereby to attach struts to the wings of an aeroplane, an important feature being that this fitting allows the joint to work two ways, it being necessary that in the diagonal struts a strong joint permitting this play is necessary.

An important object is the provision of a device of this character which will be simple and inexpensive in manufacture, easy to apply, efficient and durable in use, and a general improvement in the art.

With the above and other objects and advantages in view, the invention consists in the details of construction to be hereinafter more fully described and claimed and illustrated in the accompanying drawings in which—

Figure 1 is a side elevation associated with a strut and wing,

Fig. 2 is a cross section at right angles to Fig. 1,

Fig. 3 is a top plan view, and

Fig. 4 is a bottom plan view.

Referring more particularly to the drawings, the letter A designates the end portion of a wing strut and B designates a fragment of a wing. In carrying out my invention I provide a fitting which comprises a flat plate 10 of substantially rectangular form and formed at its corners with ears 11 provided with holes 12. This plate is designed to be placed against one side of the wing B.

Disposed against the other side of the wing in registration with the plate 10 is a similarly shaped plate 13 provided at its corners with ears 14 formed with holes 15. The eyes 12 and 15 register and suitable bolts 16, rivets, or other suitable fastening devices, are passed through these holes and through the wing for holding the device rigid upon the wing. This plate 13 is offset at its central portion, as indicated at 17, whereby the central portion will be spaced away from the adjacent surface of the wing and this offset portion is formed centrally with a hole 18 circular in shape.

Associated with the plate 13 is a swivel bolt 19 formed with a reduced threaded extension 20 passing through the hole 18. Screwed onto this threaded extension, within the offset portion 17, is a nut 21 cottered or otherwise locked against rotation with respect to the bolt. The other end of this bolt 19 is formed with an ear 22 having a hole 23 and having an arcuate shoulder 24.

The end of the strut A to be connected with the wing B is formed with a slot or bifurcation C and the resilient arms are provided with holes.

In the assembling of the parts the plate 10 is disposed against one side of the wing, the plate 13 carrying the swivel bolt 19 is disposed against the other side of the wing, and the two plates are secured in position by the bolts 16. It will be seen that the bolt 19 is revoluble with respect to the plate 13. The strut A is then placed in position with the curved end E thereof fitting against the arcuate shoulder 24 and a suitable pivot bolt or pin 25 is passed through the holes in the strut and through the holes 23 in the ear of the swivel bolt. With the parts thus assembled, it will be seen that the strut may have swinging movement in one direction with respect to the wing and that the swivel bolt 19 provides for movement in another direction.

From the foregoing description and a study of the drawings it will be seen that I have thus provided a simply constructed and consequently inexpensive fitting for attaching struts to wings in which the construction is such that the strut may have movement in two directions with respect to the wing so as to prevent binding and permit the necessary flexibility while at the same time maintaining a strong and durable connection.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A fitting for connecting a strut with a wing of an aeroplane, comprising a plate secured upon one side of the wing, a plate disposed upon the opposite side of the wing and secured thereto, a bolt swiveled through said second named plate and terminating short of the wing, and an ear on said bolt adapted for connection with the strut.

2. A fitting for connecting a strut with a wing of an aeroplane comprising a plate rigidly secured upon the wing and having an offset portion spaced from the wing and provided with a hole, a swivel bolt revolubly connected with said plate and extending through said hole, said bolt being formed with an apertured ear, and the end of the strut being bifurcated for straddling engagement upon said ear and being pivotally connected therewith.

In testimony whereof I hereunto affix my signature.

ERROLD G. BAHL.